(12) United States Patent
Chiu et al.

(10) Patent No.: US 8,797,489 B2
(45) Date of Patent: Aug. 5, 2014

(54) LIQUID CRYSTAL DISPLAY PANEL AND DISPLAY APPARATUS USING THE SAME

(75) Inventors: Chung-Yi Chiu, Shenzen (CN); Cheng-Ming He, Shenzhen (CN)

(73) Assignee: Shenzhen China Star Optoelectronics Technology Co., Ltd., Shenzhen (CN)

( * ) Notice: Subject to any disclaimer, the term of this patent is extended or adjusted under 35 U.S.C. 154(b) by 253 days.

(21) Appl. No.: 13/264,857

(22) PCT Filed: Aug. 15, 2011

(86) PCT No.: PCT/CN2011/078393
§ 371 (c)(1),
(2), (4) Date: Oct. 17, 2011

(87) PCT Pub. No.: WO2013/013429
PCT Pub. Date: Jan. 31, 2013

(65) Prior Publication Data
US 2013/0027631 A1    Jan. 31, 2013

(30) Foreign Application Priority Data
Jul. 26, 2011   (CN) .......................... 2011 1 0210383

(51) Int. Cl.
*G02F 1/1343* (2006.01)
(52) U.S. Cl.
USPC ......................................... 349/143; 349/129

(58) Field of Classification Search
USPC .................................. 349/129–130, 113, 143
See application file for complete search history.

(56) References Cited

U.S. PATENT DOCUMENTS

| | | | |
|---|---|---|---|
| 5,953,093 A * | 9/1999 | Hirata et al. ................... | 349/143 |
| 6,506,671 B1 | 1/2003 | Grigg | |
| 7,609,345 B2 * | 10/2009 | Ohmuro et al. ............... | 349/114 |
| 7,924,386 B2 | 4/2011 | Lee | |
| 7,929,096 B2 * | 4/2011 | Yeom et al. ................... | 349/139 |
| 2010/0060838 A1 | 3/2010 | Kim et al. | |

FOREIGN PATENT DOCUMENTS

| | | |
|---|---|---|
| CN | 101625491 A | 1/2010 |
| CN | 202177767 U | 3/2012 |
| JP | 1-033521 A | 2/1989 |

* cited by examiner

*Primary Examiner* — James Dudek
(74) *Attorney, Agent, or Firm* — Ditthavong & Steiner, P.C.

(57) ABSTRACT

The present invention provides a liquid crystal display panel and a display apparatus using the same. The liquid crystal display panel comprises a first substrate, a second substrate and a liquid crystal layer. The liquid crystal layer is formed between the first substrate and the second substrate. The second substrate includes a passivation layer and a plurality of pixel electrodes. The passivation layer includes a plurality of convex portions, and the pixel electrodes are formed on the passivation layer. Each of the pixel electrodes has a plurality of node patterns protruding from the periphery of the pixel electrode. The present invention can improve a dark line problem in the conventional technology.

11 Claims, 6 Drawing Sheets

LIQUID CRYSTAL DISPLAY PANEL AND DISPLAY APPARATUS USING THE SAME

FIELD OF THE INVENTION

The present invention relates to a liquid crystal display (LCD) panel and a display apparatus using the same, and more particularly to a display panel and a liquid crystal display apparatus using the same for improving a viewing angle thereof.

BACKGROUND OF THE INVENTION

Liquid crystal displays (LCDs) have been widely applied in electrical products. Currently, most of LCDs are backlight type LCDs which include a liquid crystal panel and a backlight module. The liquid crystal panel is composed of two substrates and a liquid crystal layer filled there between. A common electrode is formed on an inner surface of one of the substrates, and a plurality of pixel electrodes are formed on an inner surface of another one of the substrates. In a conventional technology, the pixel electrodes cover a passivation layer which has a plurality of convex portions. The convex portions of the passivation layer can control a vertical alignment of liquid crystal molecules, so as to enlarge a viewing angle of the LCD.

However, in the above-mentioned conventional technology, at the surrounding of each of the pixel electrodes, due to non-orthogonality between a pattern of the convex portions and the pixel electrodes, a disclination line or a dark line is formed and extends into a display zone of a pixel, hence deteriorating a display quality of the LCD.

As a result, it is necessary to provide a liquid crystal display (LCD) panel and a display apparatus using the same to solve the problems existing in the conventional technologies, as described above.

SUMMARY OF THE INVENTION

The present invention provides a LCD panel and a display apparatus using the same, so as to solve a dark line problem existing in the conventional technologies.

A primary object of the present invention is to provide a liquid crystal display panel, and the liquid crystal display panel comprises: a first substrate including a common electrode; a second substrate including a passivation layer and a plurality of pixel electrodes, wherein the passivation layer includes a plurality of convex portions, and the pixel electrodes are formed on the passivation layer, and each of the pixel electrodes has a plurality of node patterns protruding from the periphery of the pixel electrodes; and a liquid crystal layer formed between the first substrate and the second substrate.

Another object of the present invention is to provide a display apparatus, and the display apparatus comprises: a backlight module; and a liquid crystal display panel comprising; a first substrate including a common electrode; a second substrate including a passivation layer and a plurality of pixel electrodes, wherein the passivation layer includes a plurality of convex portions, and the pixel electrodes are formed on the passivation layer, and each of the pixel electrodes has a plurality of node patterns protruding from the periphery of the pixel electrodes; and a liquid crystal layer formed between the first substrate and the second substrate.

In one embodiment of the present invention, the node patterns cover the convex portions.

In one embodiment of the present invention, the display apparatus according to Claim 9, characterized in that: the node patterns are positioned between the convex portions.

In one embodiment of the present invention, portions of the node patterns of the pixel electrodes cover the convex portions, and other portions of the node patterns are positioned between the convex portions.

In one embodiment of the present invention, the node patterns are positioned outside rectangular display zones of the pixel electrodes.

In one embodiment of the present invention, the node patterns are sheltered by a black matrix.

In one embodiment of the present invention, the shape of the node patterns is a triangle, a semicircular, a rectangle or a parallelogram.

With use of the liquid crystal display panel and the display apparatus using the same, the liquid crystal molecules which are arranged at non-45 degrees are allowed to extend outside a display zone of the pixel electrodes, hence improving the transmittance thereof and enhancing the display quality.

The structure and the technical means adopted by the present invention to achieve the above-mentioned and other objects can be best understood by referring to the following detailed description of the preferred embodiments and the accompanying drawings.

DETAILED DESCRIPTION OF THE PREFERRED EMBODIMENTS

Figure 1:
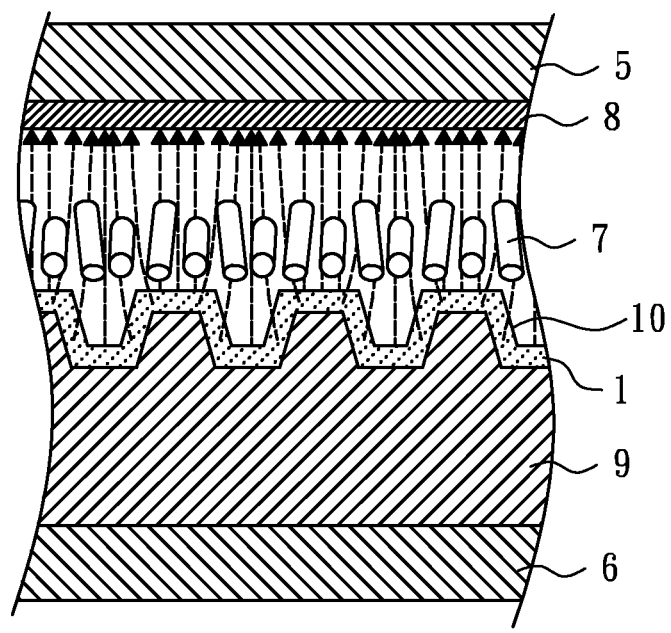
FIG. 1 is a partially cross-sectional view showing a liquid crystal display panel according to a first embodiment of the present invention.

The following embodiments are referring to the accompanying drawings for exemplifying specific implementable embodiments of the present invention. Furthermore, directional terms described by the present invention, such as upper, lower, front, back, left, right, inner, outer, side and etc., are only directions by referring to the accompanying drawings, and thus the used directional terms are used to describe and understand the present invention, but the present invention is not limited thereto.

In the drawings, structure-like elements are labeled with like reference numerals.

Referring to FIG. 1, a partially cross-sectional view showing a liquid crystal display (LCD) panel according to a first embodiment of the present invention is illustrated. The display apparatus of the present embodiment comprises a liquid crystal display panel and a backlight module (not shown). The LCD panel is disposed opposite to the backlight module, and the backlight module is used to provide the LCD panel with the back-light. The LCD panel of the present embodiment can comprise a first substrate 5, a second substrate 6 and a liquid crystal layer 7. The first substrate 5 and the second substrate 6 may be realized as glass substrates or flexible plastic substrates. In this embodiment, the first substrate 5 may be a glass substrate or another material substrate with color filters (CF), and the second substrate 6 may be a glass substrate or another material substrate with a thin film transistor (TFT) array. It should be noted that the CF and the TFT array may also be disposed on the same substrate in other embodiments. Referring to FIG. 1 again, the liquid crystal layer 7 is formed between the first substrate 5 and the second substrate 6. The first substrate 5 includes a common electrode 8 facing to the liquid crystal layer 7.

Figure 2:
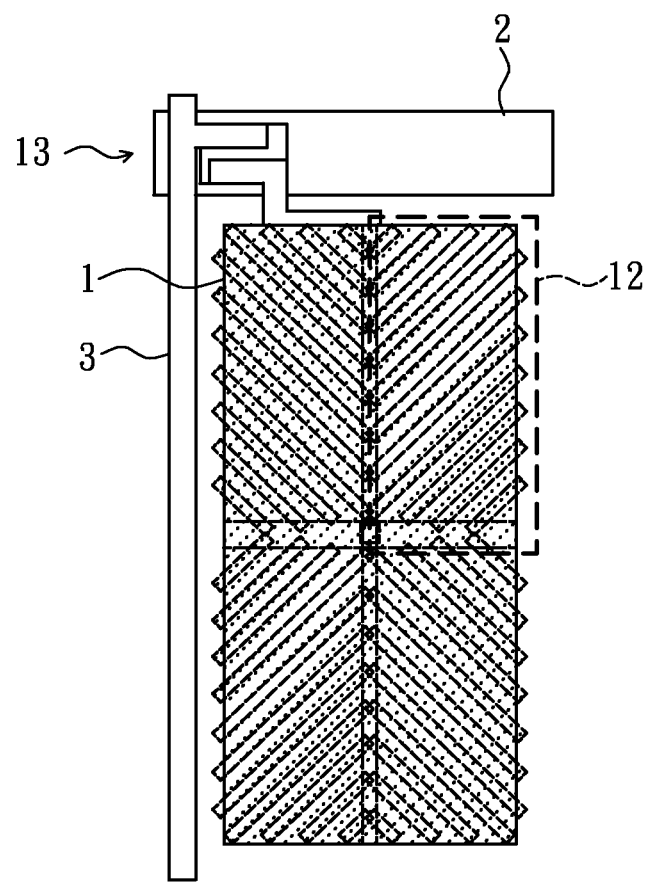
FIG. 2 is a schematic diagram showing a pixel zone of the liquid crystal display panel according to the first embodiment of the present invention.

Referring to FIG. 2, a schematic diagram showing a pixel zone of the LCD panel according to the first embodiment of the present invention is illustrated. The second substrate 6 includes a plurality of gate lines 2, a plurality of data lines 3, a passivation layer 9 and a plurality of pixel electrodes 1. The gate lines 2 and the data lines 3 are crisscrossed on the second substrate 6, and thereby form a plurality of pixel zones arranged in an array, wherein each of the pixel zones includes at least one TFT electrically connected to the adjacent gate line 2 and the adjacent data line 3. The passivation layer 9 is disposed on the second substrate 6 and includes a plurality of convex portions 10. The convex portions 10 are preferably elongated convex portions facing to the liquid crystal layer 7 and arranged regularly in each of the pixel zones, thereby forming a convex portion pattern. The convex portions 10 are used to control a vertical alignment of the molecules of the liquid crystal layer 7 for improving a viewing angle range of the LCD apparatus.

Referring to FIG. 1 and FIG. 2 again, the pixel electrodes 1 are formed on the passivation layer 9 and corresponding to the pixel zones. Each of the pixel zones is substantially rectangular and has four regional electrodes 12. In each of the regional electrodes 12, the convex portions 10 are obliquely arranged, and a plurality of grooves are correspondingly formed between the convex portions 10. Moreover, each of the pixel electrodes 1 further includes a plurality of node patterns 11 which protrude from the periphery of each of the pixel electrodes 1 as one-piece and are equally spaced at the periphery of the pixel electrodes 1. In this case, the node patterns 11 can cover the convex portions 10, or are positioned between the convex portions 10. The node patterns 11 are preferably positioned outside rectangular display zones, (i.e. zones of the pixel electrodes 1 for displaying images) or overlapped by a black matrix (not shown).

Figure 3:
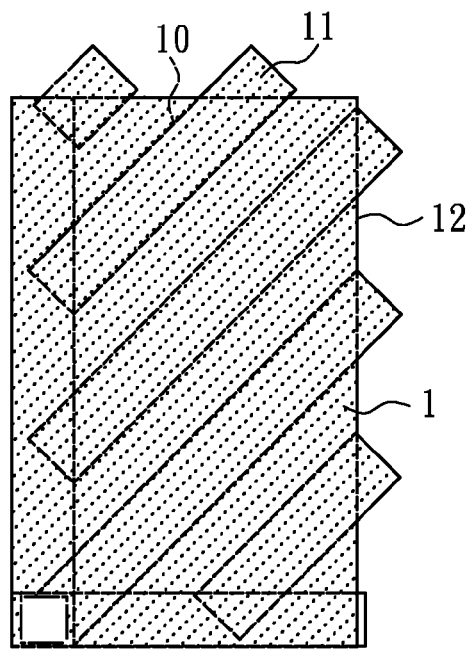
FIG. 3 is a schematic diagram showing a regional electrode of a pixel electrode according to the first embodiment of the present invention.

Referring to FIG. 3, a schematic diagram showing the regional electrode of the pixel electrode according to the first embodiment of the present invention is illustrated. In the first embodiment, portions of the convex portions 10 of the passivation layer 9 protrude from rectangular zones of the pixel electrodes 1, and the node patterns 11 of the pixel electrodes 1 cover the convex portions 10. Please refer to FIG. 7B first. When controlling the alignment of the liquid crystal layer 7, with use of the node patterns 11 around the pixel electrodes 1, a dark line 15 formed by the liquid crystal molecules can be positioned outside the display zone or sheltered by the black matrix (BM), hence enhancing the display quality of the LCD panel.

Figure 4:
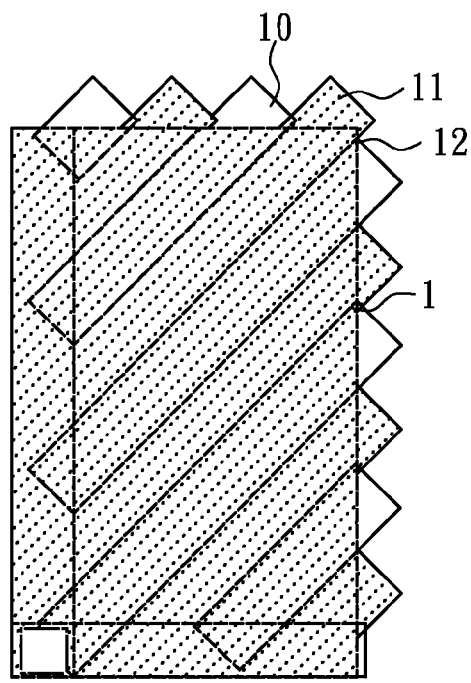
FIG. 4 is a schematic diagram showing a regional electrode of a pixel electrode according to a second embodiment of the present invention.

Referring to FIG. 4, a schematic diagram showing a regional electrode of a pixel electrode according to a second embodiment of the present invention is illustrated. In the second embodiment, the node patterns 11 of the pixel electrodes 1 may not cover the convex portions 10, but are positioned between the convex portions 10. Similarly, when controlling the alignment of the liquid crystal layer 7, with use of the node patterns 11 around the pixel electrodes 1 and positioned between the convex portions 10, the dark line formed by the liquid crystal molecules can be positioned outside the display zone or sheltered by the black matrix (BM), hence enhancing the display quality of the LCD panel.

Figure 5:
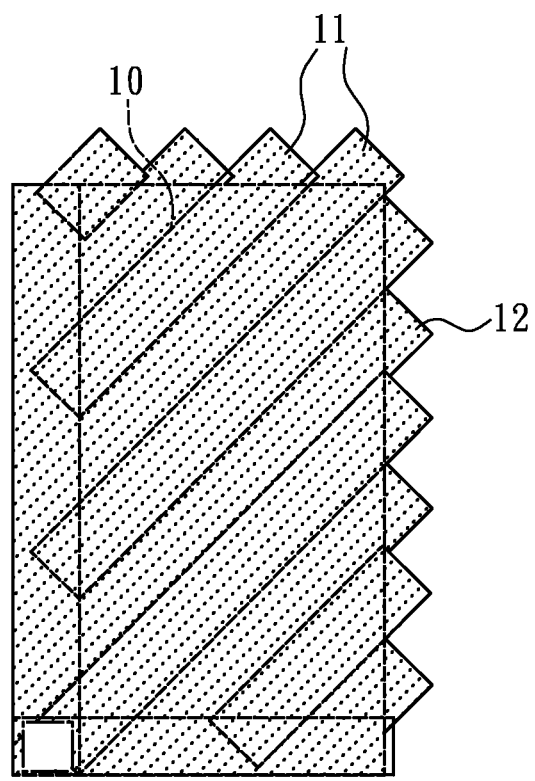
FIG. 5 is a schematic diagram showing a regional electrode of a pixel electrode according to a third embodiment of the present invention.
Figure 6A:
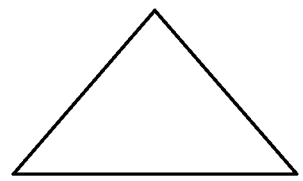
FIGS. 6A through 6E are schematic diagrams showing node patterns of the pixel electrodes of the present invention.
Figure 6B:
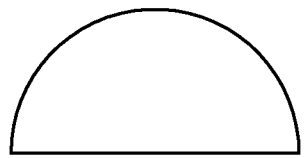
Figure 6C:
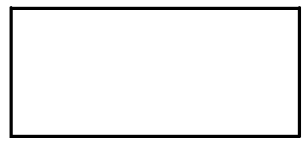
Figure 6D:
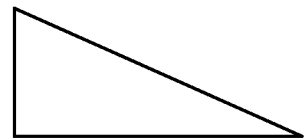
Figure 6E:

Referring to FIG. 5, a schematic diagram showing a regional electrode of a pixel electrode according to a third embodiment of the present invention is illustrated. In the third embodiment, portions of the node patterns 11 of the pixel electrodes 1 may cover the convex portions 10, and other portions of the node patterns 11 are positioned between the convex portions 10. Therefore, when controlling the alignment of the liquid crystal layer 7, with use of the node patterns 11 around the pixel electrodes 1 and positioned between the convex portions 10, the dark line formed by the liquid crystal molecules can be positioned outside the display zone or sheltered by the black matrix (BM), hence enhancing the display quality of the LCD panel.

Referring to FIG. 6A through FIG. 6E, schematic diagrams showing the node patterns of the pixel electrodes of the present invention are illustrated. The node patterns 11 of the pixel electrodes 1 of the present invention may electrode patterns of any shapes, such as triangle (referring to FIG. 6A and FIG. 6D), semicircular (referring to FIG. 6B), rectangle (referring to FIG. 6C) or parallelogram (referring to FIG. 6E)

Figure 7A:
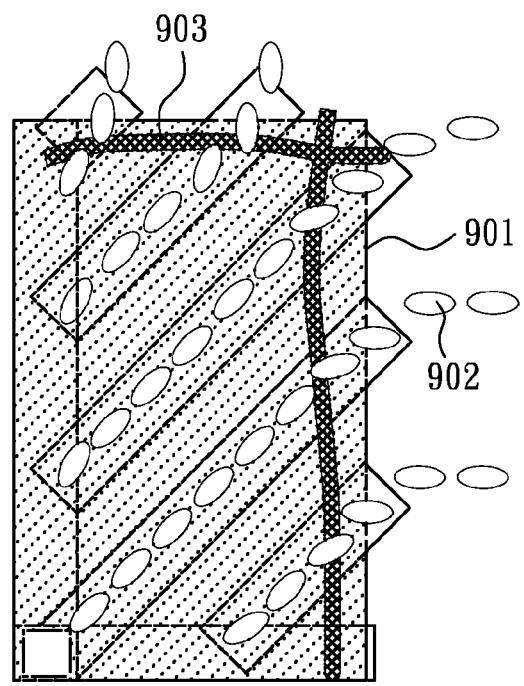
FIG. 7A is a schematic diagram showing an alignment of liquid crystal molecules and a dark line a conventional liquid crystal display panel.
Figure 7B:
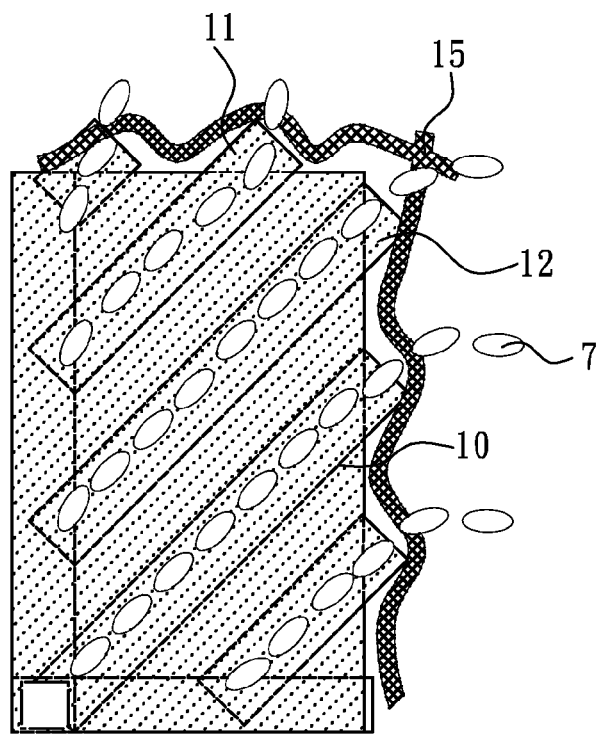
FIG. 7B is a schematic diagram showing an alignment of liquid crystal molecules and a dark line of the liquid crystal display panel according to the present invention.

Referring to FIG. 7A and FIG. 7B, FIG. 7A is a schematic diagram showing an alignment of liquid crystal molecules 902 and a dark line 903 in a zone of a pixel electrode of a conventional LCD panel, and FIG. 7B is a schematic diagram showing an alignment of liquid crystal molecules 7 and a dark line 15 in a zone of the regional pixel of one of the pixel electrodes 1 of the LCD panel according to the present invention. In comparison with the convention technique in FIG. 7A, the node patterns 11 are regularly arranged at the edge of the pixel electrodes 1, so as to allow the liquid crystal molecules 7 which are arranged at non-45 degrees to extend outside the display zone of the pixel electrodes 1, hence improving the transmittance thereof and enhancing the display quality.

The present invention has been described above with a preferred embodiment thereof, and it is understood that many changes and modifications to the described embodiment can be carried out without departing from the scope and the spirit of the invention that is intended to be limited only by the appended claims.

The invention claimed is:

1. A liquid crystal display panel, characterized in that: the display panel comprises:
   a first substrate including a common electrode;
   a second substrate including a passivation layer and a plurality of pixel electrodes, wherein the passivation layer includes a plurality of convex portions, and the pixel electrodes are formed on the passivation layer, and each of the pixel electrodes has a plurality of node patterns which are electrode patterns protruding from the periphery of the pixel electrodes, and the pixel electrodes and the node patterns are formed as one-piece, and the node patterns are positioned outside rectangular display zones of the pixel electrodes, portions of the node patterns of the pixel electrodes cover the convex portions, and other portions of the node patterns are positioned between the convex portions; and a liquid crystal layer formed between the first substrate and the second substrate.

2. A liquid crystal display panel, characterized in that: the display panel comprises:

a first substrate including a common electrode;

a second substrate including a passivation layer and a plurality of pixel electrodes, wherein the passivation layer includes a plurality of convex portions, and the pixel electrodes are formed on the passivation layer, and each of the pixel electrodes has a plurality of node patterns which are electrode patterns protruding from the periphery of the pixel electrodes, and the pixel electrode and the node patterns are formed as one-piece, and the node patterns cover the convex portions; and a liquid crystal layer formed between the first substrate and the second substrate, wherein the node patterns are sheltered by a black matrix.

3. The liquid crystal display panel according to claim 2, characterized in that: the node patterns are positioned between the convex portions.

4. The liquid crystal display panel according to claim 2, characterized in that: portions of the node patterns of the pixel electrodes cover the convex portions, and other portions of the node patterns are positioned between the convex portions.

5. The liquid crystal display panel according to claim 2, characterized in that: the node patterns are positioned outside rectangular display zones of the pixel electrodes.

6. The liquid crystal display panel according to claim 2, characterized in that: the shape of the node patterns is a triangle, a semicircular, a rectangle or a parallelogram.

7. A display apparatus, characterized in that: the display apparatus comprises:

a backlight module; and a liquid crystal display panel comprising;

a first substrate including a common electrode;

a second substrate including a passivation layer and a plurality of pixel electrodes, wherein the passivation layer includes a plurality of convex portions, and the pixel electrodes are formed on the passivation layer, and each of the pixel electrodes has a plurality of node patterns which are electrode patterns protruding from the periphery of the pixel electrodes, and the pixel electrodes and the node patterns are formed as one-piece, and the node patterns cover the convex portions; and a liquid crystal layer formed between the first substrate and the second substrate, wherein the node patterns are sheltered by a black matrix.

8. The display apparatus according to claim 7, characterized in that: the node patterns are positioned between the convex portions.

9. The display apparatus according to claim 7, characterized in that: portions of the node patterns of the pixel electrodes cover the convex portions, and other portions of the node patterns are positioned between the convex portions.

10. The display apparatus according to claim 7, characterized in that: the node patterns are positioned outside rectangular display zones of the pixel electrodes.

11. The display apparatus according to claim 7, characterized in that: the shape of the node patterns is a triangle, a semicircular, a rectangle or a parallelogram.

* * * * *